United States Patent
Goldentouch et al.

(10) Patent No.: US 10,586,345 B2
(45) Date of Patent: Mar. 10, 2020

(54) METHOD FOR ESTIMATING AGGREGATION RESULTS FOR GENERATING THREE DIMENSIONAL IMAGES

(71) Applicant: INUITIVE LTD., Ra'anana (IL)

(72) Inventors: Lev Goldentouch, Rishon Lezion (IL); Samuel Lifsches, Tel Aviv (IL); Niv Shmueli, Tel Aviv (IL); Ziv Tsoref, Tel Aviv (IL)

(73) Assignee: INUITIVE LTD., Ra'anana (IL)

( * ) Notice: Subject to any disclaimer, the term of this patent is extended or adjusted under 35 U.S.C. 154(b) by 88 days.

(21) Appl. No.: 15/574,563

(22) PCT Filed: May 15, 2016

(86) PCT No.: PCT/IL2016/000008
§ 371 (c)(1),
(2) Date: Nov. 16, 2017

(87) PCT Pub. No.: WO2016/185458
PCT Pub. Date: Nov. 24, 2016

(65) Prior Publication Data
US 2018/0130220 A1    May 10, 2018

Related U.S. Application Data

(60) Provisional application No. 62/162,763, filed on May 17, 2015.

(51) Int. Cl.
*G06K 9/00* (2006.01)
*G06T 7/593* (2017.01)
(Continued)

(52) U.S. Cl.
CPC ............ *G06T 7/593* (2017.01); *G06T 1/0007* (2013.01); *G06T 1/20* (2013.01); *G06T 2207/10012* (2013.01); *G06T 2207/10024* (2013.01)

(58) Field of Classification Search
CPC ........ G06T 7/593; G06T 7/0057; G06T 1/20; G06T 1/0007; G06T 2207/10024;
(Continued)

(56) References Cited

U.S. PATENT DOCUMENTS 7,561,732 B1 * 7/2009 Owechko ................ G06T 7/593
382/104
8,897,546 B2 * 11/2014 Ren ......................... G06T 7/593
382/154

(Continued)

OTHER PUBLICATIONS

Devy, M. et al., "Stereovision Algorithm to be Executed at 100Hz on a FPGA-Based Architecture", Advances in Theory and Applications of Stereo Vision, pp. 327-352 (Jan. 2011).

(Continued)

*Primary Examiner* — Amir Alavi
(74) *Attorney, Agent, or Firm* — Browdy and Neimark, PLLC (57) ABSTRACT

A method is provided for use in a stereoscopic image generating system, the system including at least two image capturing sensors and at least one aggregation processor. The at least one aggregation processor is configured to: receive data associated with an image captured by the image capturing sensors; calculate aggregation results for a predefined number of disparity levels based on data received from one of the at least two image capturing sensors; estimate aggregation results for data received from another image capturing sensor; and combine the calculated results with the estimated results.

19 Claims, 5 Drawing Sheets

(51) Int. Cl.
*G06T 1/00* (2006.01)
*G06T 1/20* (2006.01)

(58) Field of Classification Search
CPC ...... G06T 2207/10012; H04N 13/0239; H04N 13/0253; H04N 13/025
See application file for complete search history.

(56) References Cited

U.S. PATENT DOCUMENTS

| | | | |
|---|---|---|---|
| 9,390,508 B2* | 7/2016 | Ukil | G06T 7/593 |
| 9,513,108 B2* | 12/2016 | Einecke | G01B 11/026 |
| 9,542,750 B2* | 1/2017 | Muninder | H04N 13/128 |
| 9,892,522 B2* | 2/2018 | Smirnov | G06T 7/593 |
| 2010/0142824 A1 | 6/2010 | Lu | |
| 2011/0249889 A1* | 10/2011 | Kothandaraman | G06T 7/32 |
| | | | 382/154 |
| 2012/0014590 A1 | 1/2012 | Martinez-Bauza et al. | |
| 2015/0023587 A1 | 1/2015 | Barone | |
| 2015/0248769 A1* | 9/2015 | Ukil | G06T 7/593 |
| | | | 382/154 |
| 2017/0070726 A1* | 3/2017 | Goldentouch | G06T 7/521 |
| 2017/0366796 A1* | 12/2017 | Goldentouch | H04N 13/239 |
| 2018/0130220 A1* | 5/2018 | Goldentouch | G06T 1/0007 |
| 2019/0158813 A1* | 5/2019 | Rowell | H04N 13/246 |

OTHER PUBLICATIONS

Joshi G.S. et al., "Stereo Correspondence Cost Function for FPGAs.", International Journal of Emerging Technology and Advanced Engineering, pp. 455-459, vol. 3, No. 2, (Feb. 2013).

* cited by examiner

METHOD FOR ESTIMATING AGGREGATION RESULTS FOR GENERATING THREE DIMENSIONAL IMAGES

TECHNICAL FIELD

The present disclosure generally relates to methods for using optical devices, and more particularly, to methods that enable depth estimation in reconstruction of three dimensional images.

BACKGROUND

A stereoscopic camera arrangement is an element made of two image capturing units, assembled in a stereoscopic module. Stereoscopy (also referred to as "stereoscopics" or "3D imaging") is a technique for creating or enhancing the illusion of depth in an image by means of stereopsis. In other words, it is the impression of depth that is perceived when a scene is viewed with both eyes by someone with normal binocular vision which is responsible for creating two slightly different images of the scene in the two eyes due to the eyes'/camera's different locations.

Combining 3D information derived from stereoscopic images, and particularly for video streams, requires search and comparison of a large number of pixels to be held for each pair of images, where each image is derived from a different image capturing device.

Stereo matching algorithms are used to solve the compatibility in stereo images by using feature-, phase-, or area-based matching, for calculating the disparities in the captured images.

Feature-based matching searches use characteristics in the images, like edges or curves, for calculating the best matches according to their similarities. Phase-based algorithms band pass filter the images and extract their phase. Area-based algorithms operate on blocks (patches) of pixels from both images, for calculating their matching level. This may be done in parallel for all analyzed pixels. When using a constant block size over the whole image, called box filtering, these algorithms are especially amenable to parallel and hardware-based solutions.

When determining depth from stereoscopic sources, using different resolutions leads to achieving different results. By analyzing an image, while using a plurality of resolutions and merging the outcome of these different resolutions, the results thus obtained are notably better than results that are obtained while using a single resolution. However, when such a solution is implemented by using an FPGA/ASIC, the local storage and access to external memory need to be optimized. In such a setup, several resolutions may be analyzed line by line in parallel pipelines with different parameters and the analysis results would be merged, by using several merge setups.

Currently, the typical solution applied in the art to overcome the above problem, is, use of a hardware chip that determines depth from stereoscopic images, typically utilizing a number of aggregation machines, which number is proportional to the disparity levels that will be considered.

Aggregation machines calculate distance measures including SAD (Sum of Absolute Difference) and Census (information distance) between patches derived from the left and right captured images for each given disparity level. In most cases, separate sets of aggregation machines, are used for left-to-right disparity computation and for right-to-left disparity computation. Consequently, twice the nominal number of aggregation machines are used, and obviously, twice the amount of power is consumed. Each aggregation process is calculated in a weighted window where the weights mask is determined by YUV value of the pixels in the window.

Since aggregation machines require extensive processing power, reducing the number of aggregation machines that are used, would be rather advantageous in reducing energy requirements of the system, as well as the silicon area of the hardware chip. It would therefore be beneficial to find a solution that would help in reducing the number of aggregation machines that are used, while still retaining, or even improving, the stereoscopic detection results.

SUMMARY OF THE DISCLOSURE

The disclosure may be summarized by referring to the appended claims.

It is an object of the present disclosure to provide a method for reducing the number of aggregation processing devices required to calculate disparity of images used for constructing a stereoscopic image.

Other objects of the present invention will become apparent from the following description.

According to a first embodiment of the disclosure, there is provided a method for use in a stereoscopic image generating system comprising at least two image capturing sensors (e.g. two cameras), a memory management block, and at least one aggregation processor (machine) configured to:

calculate aggregation measure (e.g. SAD and/or Census) for a pre-defined number of disparity levels; and execute a plurality of disparity level computations, wherein the method comprises the steps of:

receiving data associated with depth of the image as perceived from a first of the at least two image capturing sensors; and calculating aggregation results for data received from the first image capturing sensor, and estimating (e.g. approximating) aggregation results for a second of the at least two image capturing sensor.

The term "image capturing sensor" as used herein throughout the specification and claims is used to denote a sensor to which a disparity image is attributed, for example, the right image capturing sensor or the left image capturing sensor. In some embodiments, a virtual reference sensor may be formed by interpolating or extrapolating disparities visible by the left and right image capturing sensors, while filling in the occlusion data.

According to another embodiment, the at least one aggregation processor is further configured to calculate an aggregation mask for data received from a first of the two image capturing sensors.

In accordance with another embodiment, the step of calculating aggregation results further comprises calculating at least one member of a group that consists of: optimization while applying a mask for data received from a first of the two image capturing sensors, and confidence penalties, and wherein the step further comprises applying the further calculated results for estimating (approximating) the aggregation results for the second image capturing sensor.

By yet another embodiment, the first image capturing sensor is positioned as the left image capturing sensor from among the two image capturing sensors.

According to still another embodiment, the estimated (approximated) aggregation results for the second image capturing sensor is obtained by carrying out a different order of costs, wherein the approximated costs for data associated with the second sensor is retrieved based on the following relationship:

cost_second_estimated[pixel, disparity]=cost_first_calculated [pixel-disparity, disparity].

The term "cost" (or "costs") as used herein throughout the specification and claims, is used to denote a measure of difference that exists between the blocks as seen by the left and right camera. The costs applied may be selected from a group that consists of one or more of the following measures: SAD (Sum of Absolute Difference), MSD (Mean Square Difference), Census (information distance), Kullback-Leibler distance, and the like. When the disparity is set accurately, the cost is minimized, i.e. the energy cost required to change the left image block into the right image block, is minimal.

As will be appreciated by those skilled in the art, the method provided by the present invention may be carried out when applying the results retrieved from the left image capturing sensor for estimating the aggregation results for the right image capturing sensor, or vice versa. Optionally, the selection of the image capturing sensor whose data will be used to estimate the aggregation results of the other sensor may be determined based on the specific case at which the method provided by the present invention is implemented.

According to another embodiment, calculating the aggregation mask for data received from a first of the two image capturing sensors is utilized in approximating an aggregation mask for data received from the second of the two image capturing sensors By yet another embodiment, the method provided further comprises a step of flipping rows of data inputs received from both image capturing sensors and reversing the flipping of the output image received from flipping the rows of data inputs received from both image capturing sensors. Preferably, the method provided further comprises a step of calculating aggregation results for data received from the first image capturing sensor based on the following relationship:

(cost_first_flipped_estimated[pixel,disparity]=cost_second_flipped_calculated[pixel-disparity, disparity])

In accordance with another embodiment, each of the at least one aggregation processor is configured to calculate aggregation for a plurality of different disparity levels.

According to still another embodiment, the method provided further comprises a step of estimating a maximal and minimal values for the disparity that exists between the images captured by both image capturing sensors (e.g. while using the closest and the farthest objects).

In accordance with another embodiment, the method further comprising a step of obtaining at least one disparity level cost by interpolating values of disparity costs associated with neighboring pixels.

According to another aspect of the disclosure, there is provided a method for use in a stereoscopic image generating system comprising two image capturing sensors and at least one aggregation processor configured to:
receive data associated with an image captured by both image capturing sensors;
calculate aggregation results for a pre-defined number of disparity levels based on data received from one of the two image capturing sensors;
estimate aggregation results for data received from the second image capturing sensors; and
combine the calculated results with the estimated results.

According to another embodiment, the stereoscopic image generating system further comprises at least one line buffer, and the method provided, further comprises a step of storing the calculated results in at least one line buffer, and flipping content of the at least one line buffer, for applying stored results obtained from calculating aggregation results based on data received from the one of the two image capturing sensors, while calculating the estimated aggregation results that are associated with data received from the second image capturing sensor.

By yet another embodiment, the method provided is used to determine depth for generating three dimensional images.

According to another aspect of the disclosure, there is provided a stereoscopic image generating system comprising:
at least two image capturing sensors (e.g. two cameras);
a memory management block;
at least one aggregation processor (machine) configured to:
calculate aggregation measure (e.g. SAD and/or Census) for a pre-defined number of disparity levels;
execute a plurality of disparity level computations;
receive data associated with depth of the image as perceived, from a first of the at least two image capturing sensors; and
calculate aggregation results for data received from the first image capturing sensor and estimate aggregation results for a second of the at least two image capturing sensors;
at least one circular buffer configured to store estimated aggregation results for the second image capturing sensor's disparity;
at least one optimizing processor configured to carry out at least one of the following operations:
a. optimization based on weighted cost filtering; and
b. combining results obtained for images retrieved from the at least two image capturing sensors and calculating confidence of the resulting combined image.

According to another embodiment, the at least one aggregation processor is further configured to calculate an aggregation mask for data received from a first of the two image capturing sensors.

By yet another embodiment, the system further comprises a memory management block, configured to enable carrying out at least one of the following operations:
retrieving data to be stored at a line buffer from at least one of the image capturing sensors and/or from an internal memory and/or from an external memory.
cropping the line buffer output differently for each one of the image capturing sensors, preferably, based on disparity handling limitations of the system; and
flipping horizontally data stored at the line buffer (i.e. enabling horizontal line flipping).

By yet another embodiment, the system comprises a plurality of aggregation processors (aggregation machines), each configured to carry out at least one of the following operations:
calculate aggregation mask for data received from one of the image capturing sensor (i.e. data received from one side);
calculate aggregation measure (e.g. SAD and/or Census) for a pre-determined number of disparity levels; and
carry out the calculations for a plurality of disparity levels.

In accordance with another embodiment, the system comprises an optimization logic configured to carry out at least one of the following operations:
  a. results optimization while implementing weighted cost filtering;
  b. combine Left-Right data and calculate confidence thereof;
  c. handling occlusions phenomena;
  d. handling image margins effects;
  e. handling outliers (data), e.g. by using: histograms and checking for connected components; and
  f. handling discontinued objects that appear in the image.

In accordance with another embodiment, the system comprises a sub-pixel disparity detector configured to carry out at least one of the following operations:
  carrying out an additional aggregation step using subpixel resolution;
  handling mask discontinuities;
  applying weighted surface fit over cost;
  affecting MRLS smoothing of results at the subpixel level; and
  handling uneven thresholds.

According to still another embodiment, the hardware of at least one of the aggregation machines is used in calculating aggregation results for a plurality of disparity levels. Typically, this embodiment will depend on factors such as the hardware calculation speed, capability to reuse the aggregation machines, and the like. Preferably, when carrying out this embodiment, several clocks will be deployed in the aggregation block, based on number of reuses expected for each of the aggregation machines.

By still another embodiment, aggregation calculations are carried out only for some of the disparity levels, based on estimated disparity levels that are present in the image (e.g. estimation which is preferably determined based on data associated with the closest and the farthest objects). Thus, each image would have minimal and maximal disparity values, which are a-priori known or computed from previous frames, allowing to limit the number of active disparity machines and DDI crop.

According to another embodiment, some disparity levels costs are interpolated from disparity costs of their neighbors, including subpixel disparity cost computation. For example, the first iteration is used for calculating the n'th costs, while the subsequent iteration is used for calculating a finer grid of 2n costs around the minimal costs.

In accordance with another embodiment, edges/discontinuities associated with the image, which are used for optimizing penalty setting, are calculated during the aggregation stage. For example, the size and shape of the aggregation mask influences the confidence level of the resulting costs.

By yet another embodiment, the aggregation is calculated by using multiple statistical methods selected from among SAD and Census, SAD non-linearly clipped from above and below, and the like. These statistical methods may be calculated for data within subsampled/upsampled patches and the results obtained while using the different methods, are subsequently merged.

According to another embodiment, the disparity level is provided using subpixel accuracy by fitting a curve between the lowest disparity point and its neighbors, wherein such a curve may be for example a parabolic curve. Then, the results are warped by using uneven sampling, implemented by using a look-up table or a set of thresholds to be associated with an arbitrary curve.

According to still another aspect of the invention, there is provided a stereoscopic image generating system that comprises:
  at least two image capturing sensors;
  at least one processor configured to:
    receive data associated with an image captured by the at least two image capturing sensors;
    calculate aggregation results for a pre-defined number of disparity levels based on data received from one of the at least two image capturing sensors;
    estimate aggregation results for data received from a second of the at least two image capturing sensors; and
    combine the calculated results with the estimated results.

In accordance with another embodiment, the stereoscopic image generating system further comprising at least one line buffer for storing the calculated results in the at least one line buffer, and wherein the at least one aggregation processor is further configured to flip content of the at least one line buffer, for applying stored results obtained from calculating aggregation results based on data received from the one of the at least two image capturing sensors, while calculating the estimated aggregation results that are associated with data received from a second of the at least two image capturing sensor.

By yet another embodiment, the at least one processor is configured to determine depth for generating three-dimensional images in the stereoscopic image generating system.

According to yet another aspect there is provided an apparatus for use in a stereoscopic image generating system, wherein the apparatus comprises:
  a receiver configured to receive information that relates to an image of a single target captured by at least two image capturing sensors;
  a dynamic data interface configured to:
    retrieve line buffer data (e.g. from one or more sensors, and/or from internal memory and/or from external memory);
    crop data retrieved from an output line buffer, wherein the data cropping is carried out differently for each of the at least two image capturing sensors (preferably but not necessarily, based on disparity handling limitations of the associated system);
    flip horizontally line data comprised in a line buffer;
  one or more aggregation processors (machines), each configured to:
    calculate an aggregation mask for a left-to-right disparity computation or for right-to-left disparity computation;
    calculate an aggregation results (e.g. SAD and/or Census) for data received from one image capturing sensor and estimate aggregation results for data received from another image capturing sensor.

The term "line buffer" as used herein throughout the specification and claims is used to denote a buffer for storing data derived from one or more lines of the captured image. For example, for down-sampling also in the vertical direction, the content of several lines will be stored. Also, the line buffer may be used to store part of one or more lines, for example, when the ROI (Region of Interest) part of the one or more lines is being processed directly (i.e. without storing it at the line buffer), while the down-sampling data requires small (i.e. smaller than line) buffer capacity.

BRIEF DESCRIPTION OF THE DRAWING

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Figure 1:
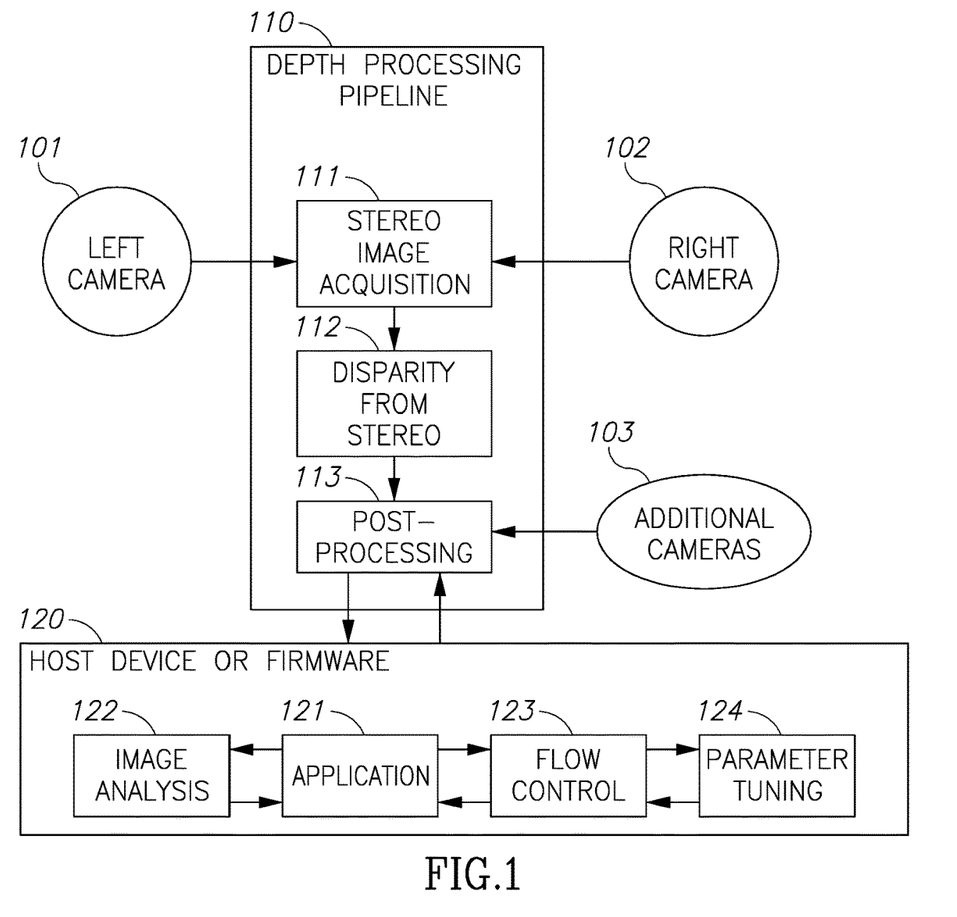
FIG. 1 is a block diagram exemplifying a system construed in accordance with an embodiment of the present disclosure.

FIG. 1 is a block diagram exemplifying a system construed in accordance with an embodiment of the present disclosure. Depth cameras 101 and 102 are operative to capture the same target image but obviously with some displacement therebetween, caused due to the baseline that exists between the two captured images. These cameras are used for obtaining the depth dimension from the captured images.

In addition, one or more cameras 103 may be included, such as webcams that provide an RGB image having higher resolution. However, such an RGB image needs to be integrated with the depth image in order to obtain the 3D display.

Depth processing pipeline 110 may be implemented by using VLSI/FPGA and may generate disparity and depth data as well as retrieved RGB data from the cameras' inputs. The pipeline is controlled via registers and shadow registers, set by the host and the firmware 120.

Stereo image acquisition 111 may be a hardware pipeline, carrying out any processing required for retrieving valid stereo images from cameras 101 and 102, such as sensor control, sensor synchronization, geometric distortion correction, illumination correction and the like.

Figure 2:
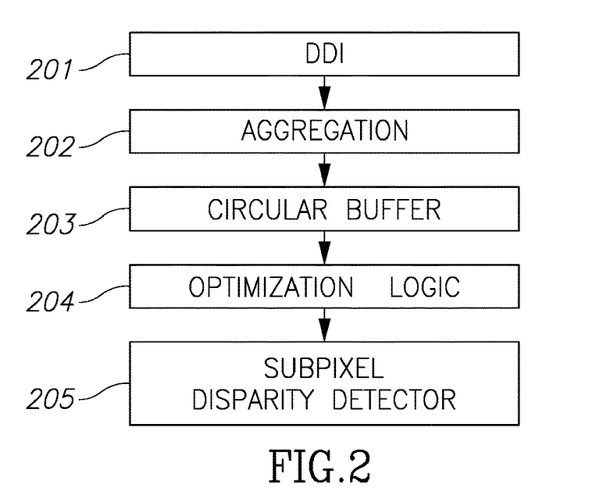
FIG. 2 exemplifies certain steps taken in order to obtain the disparity from stereo block 112 of FIG. 1.

Disparity retrieved from stereo block 112 may be hardware pipeline carrying out operations that are required in order to obtain disparity from the stereo images as depicted in FIG. 2.

Post-processing block 123 may be implemented as a hardware, for improving the disparity image and for generating the depth output. In some embodiments, it may further be combined with RGB camera outputs.

Host device (or firmware) 120 controls the depth processing pipeline 110 and is configured to generate the output required by the end user.

Application 121 may be used to execute various algorithms requested by the user, including for example face detection, and/or skeleton tracking, and/or hands' movements tracking, and/or gaze tracking, and/or 3D object stitching, and the like.

Image analyzer 122 may include image segmentation, an/or object detection and/or motion analysis.

Flow control 123 may execute operations associated with a complex flow with multiple heterogeneous frame acquisition.

Parameter tuning 124 may include means to generate specific registers and shadow registers values, as well as to modify software and firmware parameters for each consecutive frame.

FIG. 2 exemplifies certain steps taken in order to obtain the disparity data from stereo block 112 of FIG. 1. The input images from the right and left sensors may be pre-processed by Direct Data Interface (DDI) 201 block, as depicted in more details in FIG. 3.

Figure 4:
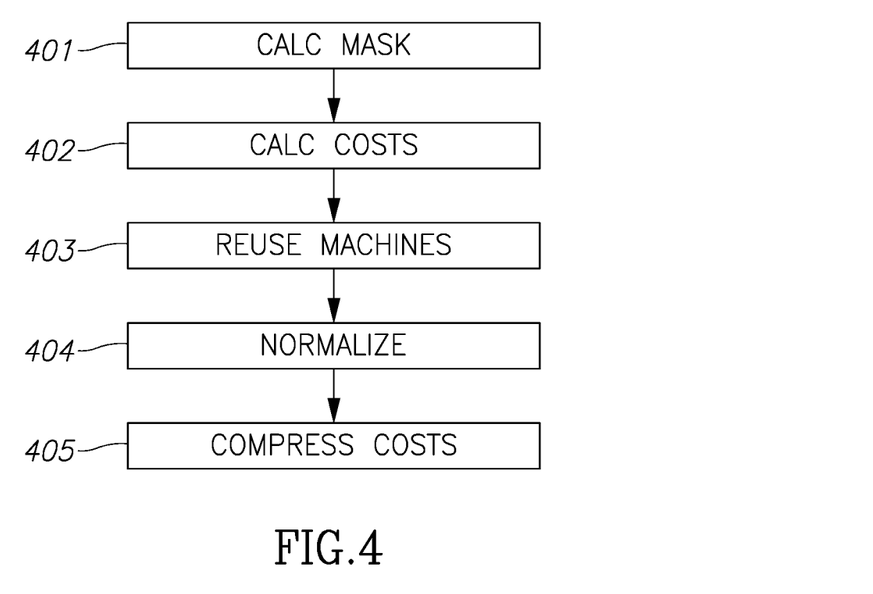
FIG. 4 exemplifies an embodiment of an operating method carried out by aggregation block 202 of FIG. 2.

Left and right sensors' data may be compared on a patch-by-patch basis in aggregation block 202 as demonstrated in FIG. 4. The output of the aggregation process are costs associated with each disparity level, as calculated from data retrieved from one of the sensors, as opposed to methods carried out in accordance with prior art solutions, where the aggregation is computed independently for each one of the two sensors.

Figure 5:
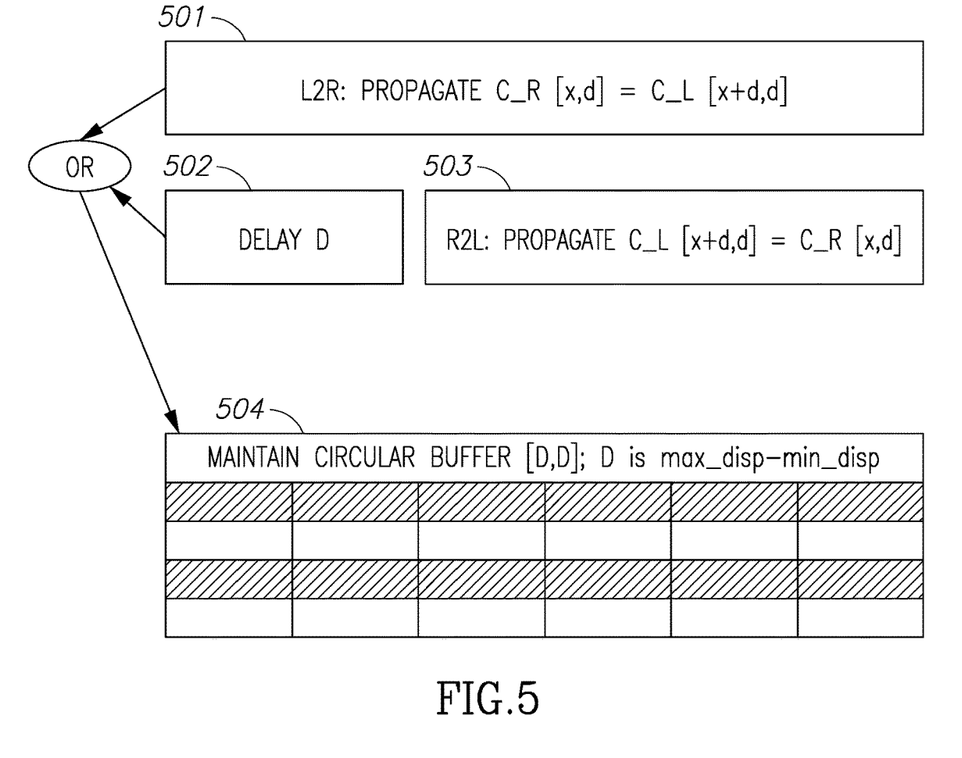
FIG. 5 demonstrates operation of a circular buffer 203 of FIG. 2 in estimating the associated costs per a disparity level for the complementary sensor.

A circular buffer 203 may be implemented to estimate (e.g. approximate) the costs per a disparity level for the complementary sensor as shown in FIG. 5.

Figure 6:
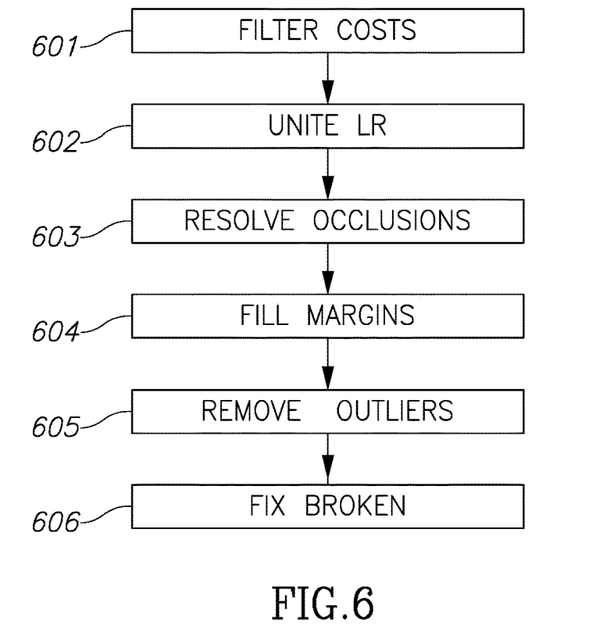
FIG. 6 exemplifies a method wherein optimization logic 204 of FIG. 2 is configured to remove discrepancies in costs, to combine left and right sensor data and to provide appropriate candidates for disparity calculation.

Optimization logic 204 may be configured to remove discrepancies in costs, to combine left and right sensor data and to provide the candidates for calculating the disparity as demonstrated in FIG. 6.

Figure 7:
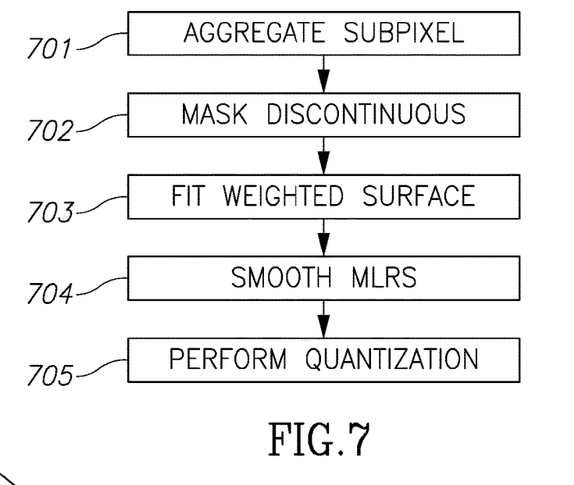
FIG. 7 demonstrates an example of using subpixel disparity detector 205 of FIG. 3 to refine disparity accuracy by using subpixel data.

Subpixel disparity detector 205 may be used to refine disparity data by applying subpixel accuracy as shown in FIG. 7.

In other embodiments of the invention, additional configurations of such a system may be implemented. For example, subpixel disparity computation may be performed by an aggregation module. By another example, multiple instances may exist for each block, and implementing smart merging of such instances.

Figure 3:
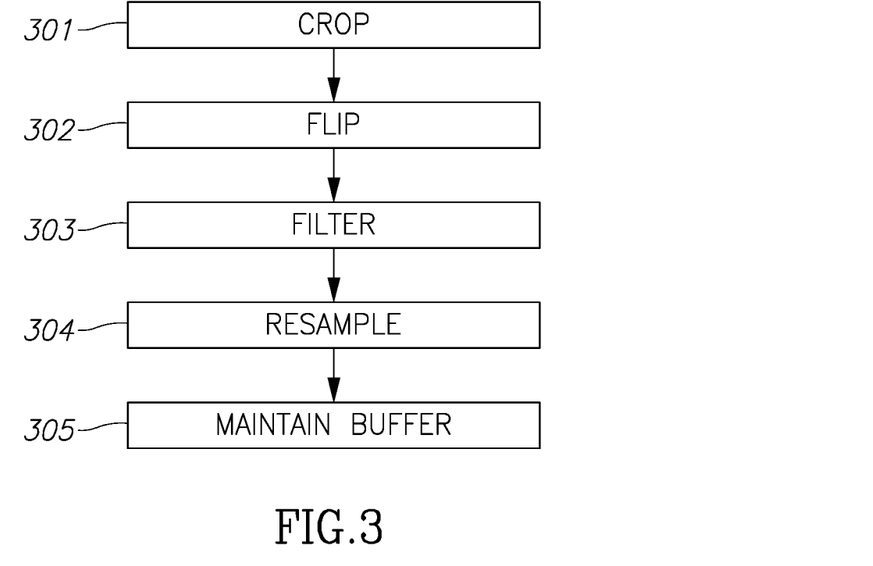
FIG. 3 illustrates certain steps in pre-processing data of input images from the right and left sensors by Direct Data Interface (DDI) 201 block shown in FIG. 2.

FIG. 3 illustrates certain steps in pre-processing data associated with input images derived from the right and left sensors, by Direct Data Interface (DDI) 201 block shown in FIG. 2. The inputs retrieved from the left and right sensors are cropped (301) according to the region of interest (ROI) of the reference sensor and the minimal disparity of the objects of interests. In some embodiments, the region of interest and disparities of interest may be known a-priori or retrieved from an analysis that had already been carried out for previous frames.

In some embodiments, the left and right image data may be flipped 302 horizontally line by line. Hardware implementation for carrying out such data flipping, may require the use of line buffers in order to store image pixels obtained from the left and right sensors, a MUX to switch between data from the left and right sensors (so that the sign of disparity is positive), and reverse flip, for example following the processing of data retrieved from subpixel disparity detector 205.

In further embodiments, there is a step of filtering data (303) which may be used for example for antialiasing, noise removal and/or detail enhancement.

Yet in other embodiments, the left and right images are resampled (304) in order to optimize accuracy, power consumption or aggregation block coverage.

By other embodiments, there is a step of maintaining an output buffer (305), which may be used for example to enable multiple instances of the processing stages 202-205. In addition, a complex merging logic may be used in order to merge results obtained from operating stages 202-205.

FIG. 4 exemplifies an embodiment of a method carried out by the aggregation block where the aggregation process is used to calculate a cost metrics per a disparity level, as will be further explained. The cost metrics in this example is calculated by carrying out a block-by-block comparison of the original sensor data, with the corresponding disparity block of the estimated (complementary) data.

Mask 401 is calculated using grayscale and color data, according to some color distance metrics extending between the central pixel of the block of interest, and the pixel for which the mask value is being calculated. In some embodiments, the mask threshold values may be different for the center of the aggregation block when compared with the peripheral area of that aggregation block. In addition, the mask may be calculated differently for different disparity levels, offering compensation for differences that exist in illumination intensities between near objects and far objects.

A processing device (402) calculates costs using some distance metrics, such as Sum of Absolut Differences (SAD), or Census or any combination thereof. The cost may be aggregated for all pixels participating in mask. The cost may be associated with an upper and lower limits, so as to eliminate numerical problems that might occur due to overflow and quantization noise, optical noise and other disturbances.

In some cases, use of delay buffers would be required when implementing this solution, using hardware to enable simultaneous processing of data from the left and right sensors.

When the aggregation machines need to be re-used (403), the clock of the hardware (silicon) implementation may be configured in a way that each cost computation machine may be used to compute several disparity costs. This way, the silicon area of the aggregation block may be effectively reduced and the energy utilization be optimized. In some embodiments, each aggregation machine may have a separate enabling signal, so that machines that are currently not busy carrying out the aggregation process, would not consume unnecessarily energy.

Next, the aggregated cost is normalized (404) while taking into account factors such as the cost metrics (SAD/Census), the size of the mask used to calculate cost, DDI resampling ratio, an a-priori probability for achieving a disparity value of interest, and possibly some other relevant information.

For further optimizing the results obtained, the costs are compressed (405). In some embodiments, the number of bits within a cost are compressed by using a differential or a logarithmic type of compression. In addition or in the alternative, the number of active costs are compressed by utilizing only some N best costs from among all the costs, or by utilizing N best costs having minimal distance D between any two costs. Narrow communication bandwidth between aggregation module 202 and optimization logic module 204 would enable better and faster silicon implementation due to silicon layout optimization.

FIG. 5 demonstrates operation of a circular buffer 203 depicted in FIG. 2, for estimating the costs for the complementary sensor on a per disparity level basis. In the examples illustrated hereinabove, the aggregation is calculated for one direction, and is then propagated for a complementary direction using circular buffer 203.

The circular buffer may be used either in the right-to-left direction or in the left-to-right direction. If the aggregation mask on the left sensor is equal to the aggregation mask on the right sensor, the cost of pixel X and disparity d of the left-to-right aggregation is equal to the cost of pixel X+d and disparity d of the right-to-left aggregation. Since aggregation masks are not equal, the circular buffer can only approximate the correct aggregation, with some approximation error (typically near discontinuities).

The circular buffer is used either to calculate the estimated aggregation in the left-to-right direction (501) or in the right-to-left direction (503). In case that the left-to-right direction is applied, it might be preferred to deploy a delay buffer 502 with D disparities and D costs, to ensure that all costs are available for computation.

The data stored in circular buffer (504) comprises costs that were calculated either via the 501 route or the 503 route. The number of rows in the circular buffer may be equivalent to the number of active costs in optimization logic 204, to enable fast parallel retrieval of costs. The number of columns in buffer 504 is equivalent to the number of costs at the output of aggregation block 202. In some implementation, the shape of buffer 504 is square, and the number of both the columns and the rows is limited by the difference between the highest and the lowest disparities in the image, D.

FIG. 6 exemplifies a method whereby optimization logic 204 of FIG. 2 is configured to remove discrepancies in costs, to combine left and right sensors' data and to provide the candidates for the disparity evaluation.

The step of filtering costs (601) is used to eliminate discrepancies if indeed exist between costs in neighboring pixels. For example, in some implementations of the system, a dynamic programming of the costs penalties in the top-bottom, left-right and right-left directions is used. Alternatively, in some other implementations 8 or more directions are used. For example, the costs may be smoothed by a 3×3 or a 5×5 filter per a disparity level, or by using a 3×3×3 filter jointly shared by different disparity levels.

The step of combining LR (602) is carried out in order to eliminate discrepancies between left-to-right and right-to-left aggregation directions. If such discrepancies exist, they might point out to occlusions or numerical noise or other error factors, thereby reducing confidence in the relevant disparities. In some embodiments of the disclosure, the resulting disparities are calculated for a reference sensor, which may be the left sensor, the right sensor or a virtual sensor, where the latter is virtually positioned between the left and right sensors or at any other virtual position. In addition, the reference sensor may be located such that its position takes into account the fact that an additional RGB camera is used together with both other cameras (the cameras outputting data used for depth calculation).

The step of resolving occlusions (603) is carried out by using the disparity values of the proper aggregation direction in occluded areas. In some embodiments, the occlusion correction formula may depend on the sensor geometry, location of the reference sensor and/or illumination geometry.

Step 604 is filling margins in order to extrapolate disparities having values that are outside the values available from the aggregation machines of the aggregation block, within the area of the reference sensor. In some embodiments, linear gradient extrapolation may be used. In other embodiments, the extrapolated disparities are attributed with lower confidence.

In step 605, outliers are removed, for example by using a combination of connected component analysis, disparity value histograms, disparity confidence values, and the like.

Finally, in step 606 non-continuous objects ("broken objects") are fixed using lower priority disparity candidates to enforce disparity continuity of objects jointly with continuity of objects in YUV or RGB color space.

The term "YUV" as used herein refers to a color space typically used as part of a color image pipeline. It encodes a color image or video while taking human perception into account and allowing reduced bandwidth for chrominance components, thereby typically enabling transmission errors or compression artifacts to be more efficiently masked by the human perception than if a "direct" RGB-representation would have been used. As will be appreciated by those skilled in the art, YUV is provided in this example as an illustrative applicable format, but obviously, other formats such RGB, grayscale or others, may be used. Also, it should be noted that the process may be accelerated by performing length encoding or by sub-sampling color channels. The number of bits used per pixel may vary from one color channel to another.

FIG. 7 demonstrates an example of using subpixel disparity detector 205 of FIG. 3 to refine disparity data with subpixel accuracy.

In step 701, the aggregate subpixel images use fine shifts between left and right blocks around the best disparity candidates. These shifts may be for example 2D to compensate slight mis-registrations between sensors, in which case a 0.5 pixel shifts for example, may be used. In some embodiments of the present disclosure, a patch-match (PM) method may be used to reduce the amount of subpixel shifts.

In some embodiments, the output disparity may be at a higher resolution than that of the input image, for example, as preparation for joint interpolation with an additional RGB camera.

Mask discontinuities 702 are used to compensate for discontinuities/edges in the image or in disparity. In some embodiments, the subpixel disparity should be found only in cases when considering continuous surfaces.

A fit weighted surface 703 may implement for example a parabolic fit over several points for which the surface is continuous and the disparity is known. 1D or 2D fits may be used.

The subpixel values are smoothed by applying an MRLS (a weighted Moving Recursive Least Square fit) method 704 in this example, over a small patch of a surface of reference. This step may also reduce distortions caused by interpolated pixels over occlusions, black areas in projected pattern, metallic blinks and other noisy surfaces.

Next, quantization of subpixel results 705 is carried out by using non-even thresholds. In some embodiments, the subpixel results are distributed unevenly between the disparity levels. For example, uneven distribution may be caused due to the non-linear nature of optimization logic 204. Using unevenly configured thresholds, may be useful to rectify the subpixel results for achieving a more uniform distribution.

Figure 8:
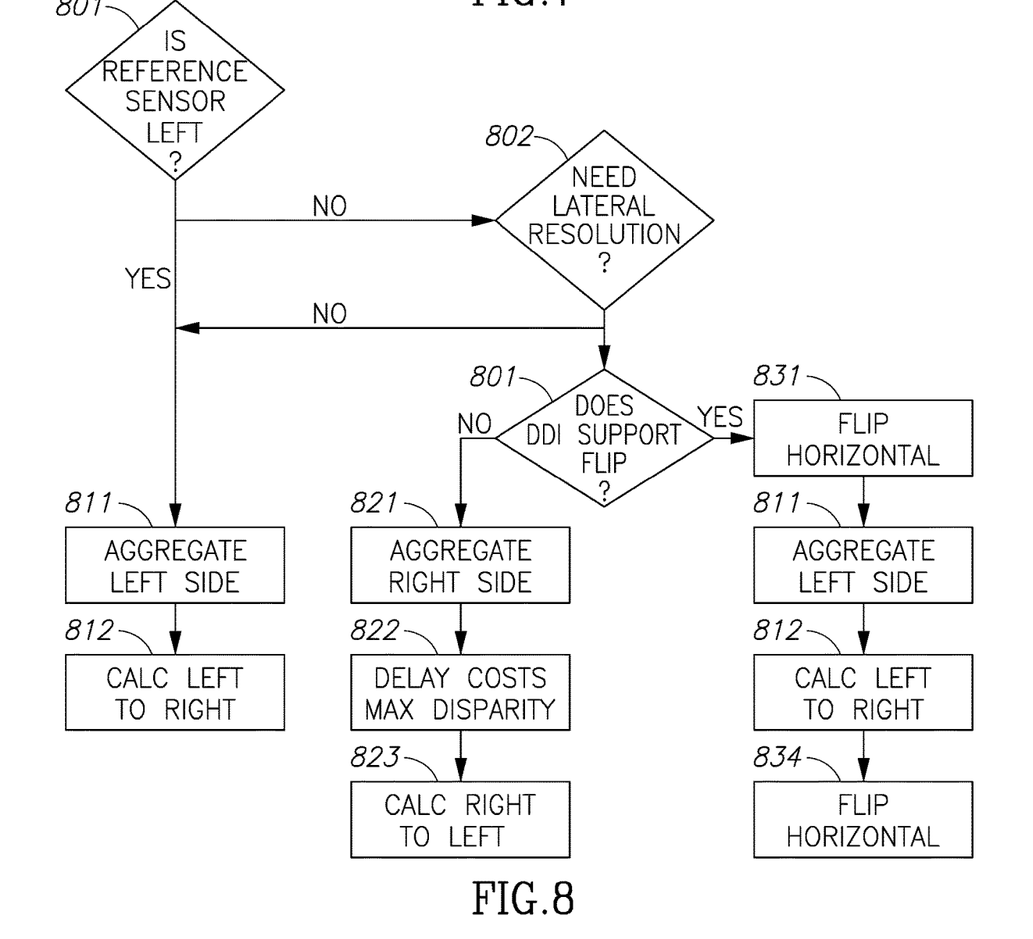
FIG. 8 exemplifies an embodiment of the disclosure of a method for selecting the complementary side aggregation approximation.

FIG. 8 exemplifies an embodiment of the disclosure of a method for selecting the complementary side aggregation approximation. Since there are several methods for implementing the complementary side aggregation approximation, following is one example demonstrating selection of such an approximation method.

First, determining whether the reference sensor is located near the left physical sensor (801). If the reference sensor is the left sensor, then the following steps would be carrying out for aggregation based on right-to-left side (811) and configuring a circular buffer 203 to estimate (approximate) a left-to-right aggregation (812).

If the determination is that the reference sensor is not located near the left physical sensor, it is assumed that the reference sensor is located near the right physical sensor. In this case, the next step would be determining whether the output lateral resolution should be of high quality (802). If the output lateral resolution quality may be reduced, or if the reference sensor is positioned in the middle between the left and the right sensors (e.g. a virtual reference sensor), aggregation on right-to-left side is carried out (811) and circular buffer 203 is configured to approximate left-to-right aggregation (812). In such a scenario, the masks calculated for the left sensor may be used for results displayed on the reference sensor right, which may reduce lateral resolution of the system.

If a high lateral resolution is required (step 802) and the reference sensor is located near the right physical sensor, the physical implementation of the aggregation approximation on silicon may require additional one or more delay buffers.

The next step is determining whether the DDI supports a horizontal flip (803). If horizontal flip is indeed supported, each line may be flipped horizontally and data from the left and right sensors may be swapped to support aggregation on the left side (831), followed by carrying out aggregation procedure for the right-to-left side (811) and configuring circular buffer 203 to approximate left-to-right aggregation (812). Then the costs or the best disparity value are flipped horizontally again (834) to compensate the original flip. In such a setup, aggregation masks calculated on the right sensor is used for disparity computation on the right reference sensor, even though the whole computation is performed on left side aggregation. In some implementations, the same modules (811) and (812) may be used for both the high-lateral-resolution left side reference sensor and high-lateral-resolution right side reference sensor with a flip.

On the other hand, if DDI flip is not supported by the setup and a high lateral resolution is required on the right reference sensor, a left-to-right aggregation (821) may be used with a circular buffer 203 configured to approximate right-to-left aggregation (823). In this setup one or more additional delay buffers may be used to accommodate delay costs (822) according to the maximal disparity required.

Figure 9:
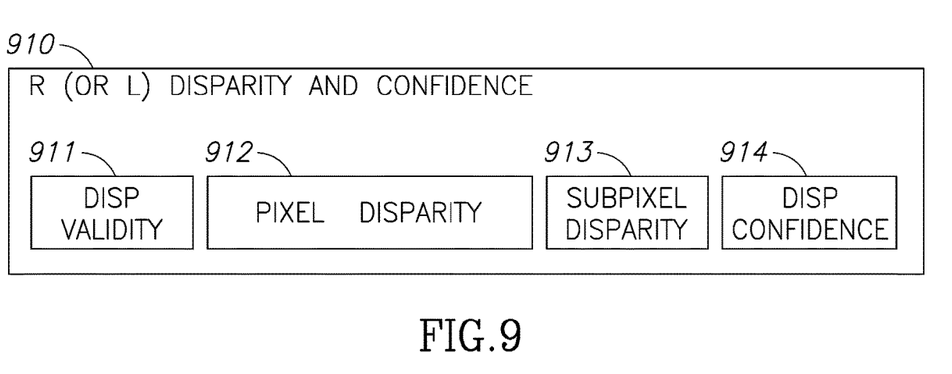
FIG. 9 illustrates an example of disparity data representation.

FIG. 9 illustrates an example of a disparity data representation. The example illustrated in this FIG. shows a data structure 910 used to store disparity and confidence of a pixel. The data structure may comprise several fields. For example, disparity validity 911 that may be used to mark interpolated occluded pixels or pixels located at the image margins. Pixel disparity 912 may contain the disparity optimizing left-to-right costs and may also comprise additional disparity candidates. Subpixel disparity 913 may comprise subpixel disparity value detected by subpixel disparity detector 205. Disparity confidence 914 may reflect confidence of the combination process or of any other optimization processes carried out by optimization logic 204, and optionally may be split between pixel-level confidence and subpixel-level confidence.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for use in a stereoscopic image generating system comprising at least two image capturing sensors, a memory management block, and at least one aggregation processor configured to:
   calculate aggregation measure for a pre-defined number of disparity levels; and
   execute a plurality of disparity level computations,
   wherein the method comprising the steps of:
   receiving data associated with depth of the image as perceived from a first of the at least two image capturing sensors; and
   calculating aggregation results for data received from said first image capturing sensor and estimating aggregation results for a second of the at least two image capturing sensors.

2. The method of claim 1, wherein the at least one aggregation processor is further configured to calculate an aggregation mask for data received from said first image capturing sensor.

3. The method of claim 2, wherein calculating the aggregation mask for data received from the first image capturing sensor is utilized for estimating an aggregation mask for data received from the second image capturing sensor.

4. The method of claim 1, wherein the step of calculating aggregation results further comprises calculating at least one member of a group that consists of: optimization while applying a mask for data received from a first of the two image capturing sensors, and confidence penalties, and wherein said step further comprises applying the further calculated results for estimating of the aggregation results for the second image capturing sensor.

5. The method of claim 1, wherein the first image capturing sensor is positioned as the left image capturing sensor from among the at least two image capturing sensors.

6. The method of claim 1, wherein the estimated aggregation results for the second image capturing sensor are obtained by carrying out a different order of costs, wherein the estimated costs for data associated with the second image capturing sensor is calculated based on the following relationship:
   cost_second_estimated[pixel, disparity]=cost_first_calculated [pixel-disparity, disparity].

7. The method of claim 1, further comprising a step of flipping rows of data inputs received from both image capturing sensors and reversing the flipping of the output image received from flipping the rows of data inputs received from both image capturing sensors.

8. The method of claim 7, further comprising a step of calculating aggregation results for data received from said first image capturing sensor based on the following relationship:
   (cost_first_flipped_estimated[pixel,disparity]=cost_second_flipped_calculated[pixel-disparity, disparity]).

9. The method of claim 1, wherein each of the at least one aggregation processor is configured to calculate aggregation for a plurality of different disparity levels.

10. The method of claim 1, further comprising a prior step of estimating maximal and minimal values for a disparity that exists in an image captured by both image capturing sensors.

11. The method of claim 1, further comprising a step of obtaining at least one disparity level cost by interpolating values of disparity costs associated with neighboring pixels.

12. The method of claim 1, wherein said method further comprises a step of
   combining the calculated aggregation results with the estimated aggregation results.

13. The method of claim 12, wherein the stereoscopic image generating system further comprises at least one line buffer, and wherein the method further comprises a step of storing the calculated results in at least one line buffer, and flipping content of the at least one line buffer for applying stored results obtained from calculating aggregation results based on data received from the one of the image capturing sensors, while calculating the estimated aggregation results that are associated with data received from the other image capturing sensor.

14. A stereoscopic image generating system comprising:
   at least two image capturing sensors;
   at least one aggregation processor configured to:
      calculate aggregation measure for a pre-defined number of disparity levels;
      execute a plurality of disparity level computations;
         receive data associated with depth of the image as perceived from a first of the at least two image capturing sensors; and
         calculate aggregation results for data received from said first image capturing sensor and estimate aggregation results for a second of the at least two image capturing sensors;
   at least one circular buffer configured to store estimated aggregation results for the second sensor disparity;
   at least one optimizing processor configured to carry out at least one of the following operations:
      (i) carrying out optimization based on weighted cost filtering; and
      (ii) combining results obtained for images retrieved from the at least two image capturing sensors and calculate confidence of the resulting combined image.

15. The system of claim 14, wherein the at least one aggregation processor is further configured to calculate an aggregation mask for data received from a first of the at least two image capturing sensors.

16. A stereoscopic image generating system comprising:
   at least two image capturing sensors;
   at least one processor configured to:
      receive data associated with an image captured by the at least two image capturing sensors;

calculate aggregation results for a pre-defined number of disparity levels based on data received from a first of the at least two image capturing sensors; and estimate aggregation results for data received from a second of the at least two image capturing sensors.

17. The stereoscopic image generating system of claim 16, further comprising at least one line buffer for storing calculated results in said at least one line buffer, and wherein said at least one processor is further configured to flip content of the at least one line buffer, for applying stored results obtained from calculating aggregation results based on data received from the one of the at least two image capturing sensors, while calculating the estimated aggregation results that are associated with data received from the second image capturing sensor.

18. The stereoscopic image generating system of claim 16, wherein the at least one processor is configured to determine depth for generating three-dimensional images.

19. An apparatus for use in a stereoscopic image generating system, wherein the apparatus comprises:

a receiver configured to receive information that relates to an image of a single target captured by at least two image capturing devices;

a dynamic data interface configured to:
  retrieve line buffer data;
  crop data retrieved from an output line buffer, wherein the data cropping is carried out differently for each of the at least two image capturing sensors; and
  flip horizontally line data comprised in a line buffer;

one or more aggregation processors, each configured to:
  calculate an aggregation mask for a left-to-right disparity computation or for right-to-left disparity computation; and
  calculate an aggregation results for data received from one image capturing sensor and estimate aggregation results for data received from another image capturing sensor.

* * * * *